United States Patent [19]

Hayashi et al.

[11] Patent Number: 4,779,952
[45] Date of Patent: Oct. 25, 1988

[54] OPTICAL CONNECTOR

[75] Inventors: Kyozo Hayashi; Shigeru Noda, both of Osaka, Japan

[73] Assignee: Sumitomo Electric Industries, Ltd., Higashi, Japan

[21] Appl. No.: 437,457

[22] Filed: Oct. 28, 1982

[30] Foreign Application Priority Data

Nov. 4, 1981 [JP] Japan .................. 56-175736

[51] Int. Cl.$^4$ .............................................. G02B 6/38
[52] U.S. Cl. ............................ 350/96.21; 350/96.20
[58] Field of Search ........................ 350/96.20, 96.21

[56] References Cited

U.S. PATENT DOCUMENTS 4,167,303 9/1979 Bowen et al. ............... 350/96.21

Primary Examiner—William L. Sikes
Assistant Examiner—Robert E. Wise
Attorney, Agent, or Firm—Harness, Dickey & Pierce

[57] ABSTRACT

An improved optical connector for connection between two pairs of optical connectors is proposed. It consists of a female housing and a male housing. One of the housings is adapted to hold plugs carrying the optical fibers with some clearance left with respect to the inner wall to allow lateral displacement of the plugs for self-alignment between the optical fibers connected.

2 Claims, 3 Drawing Sheets

OPTICAL CONNECTOR

The present invention relates to a dual optical connector used to connect two pairs of optical connectors together or connect two optical fibers with a light emitting element and a light receiving element.

In a conventional optical connector of this type, a pair of plugs each carrying an optical fiber are secured in a male housing at a uniform distance therebetween. Another pair of plugs each carrying an optical fiber are similarly secured in a female housing. When the male housing is coupled to the female housing, the optical fibers are connected. In order to minimize the connection loss due to inaccuracies in position or angle and/or minute curvedness, it is required that the distance between the holes in which the plugs are received be uniform and highly accurate. However, because the housings are usually made of synthetic resin by molding, it is difficult to maintain high accuracy owing to thermal contraction. Such dimensional inaccuracies result in poor alignment between the plugs and thus the optical fibers, thus decreasing the coupling efficiency. This necessitates a strict control of the molding conditions and maintenance of the dies.

The same is true for optical connectors for connection between optical fibers and light emitting and light receiving elements.

An object of the present invention is to provide a dual optical connector which does not require so high a dimensional accuracy for its housings.

In accordance with the present invention, the optical connector has two housings, one of which is adapted to rigidly hold the plugs each carrying an optical fiber or the light emitting element and the light receiving element and the other of which is adapted to elastically hold the plugs each carrying an optical fiber by means of springs. The plugs held in the latter housing are displaceable in a lateral direction for self-alignment.

Other features and objects of the present invention will become apparent from the following description taken with reference to the accompanying drawings, in which:

FIGS. 1-4 show an optical connector for providing connections between two pairs of optical fibers. It may be used for connection between all-glass fibers (AGF), between all-plastic fibers (APF) or between all-glass fibers and all-plastic fibers.

Figure 1:
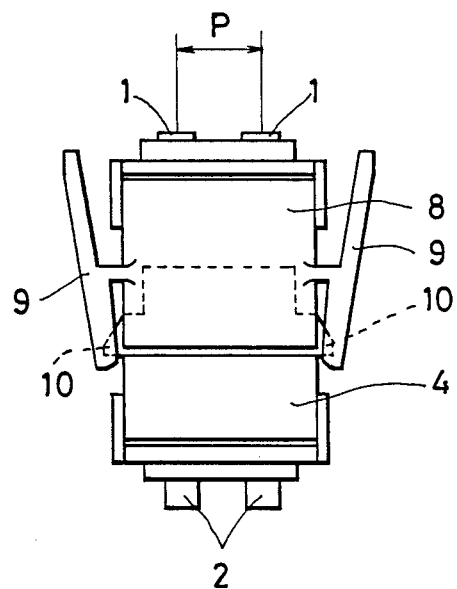
FIG. 1 is a plan view of the optical connector embodying the present invention.
Figure 2:
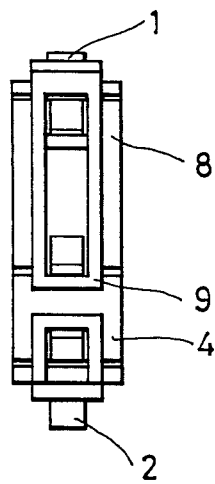
FIG. 2 is a side view thereof.
Figure 3:
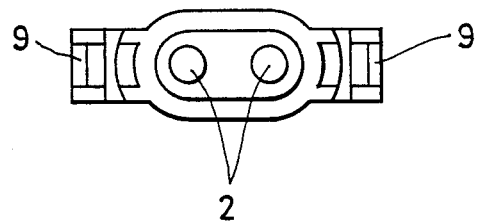
FIG. 3 is a bottom view thereof.

Alignment holes 3 are provided in a male housing 4 to guide and connect plugs 1 and 2 attached to the end of optical fibers. The holes 3 are spaced with a distance P between them. Each hole 3 has two tapered portions 3B and a straight portion 3A disposed therebetween. The tapered portions 3B serve to guide the plugs 1 and 2. The hole may be formed with parallel portions on its opposite ends in order to increase the accuracy of alignment.

The plug 2 is secured in the male housing 4. The end of the plug 2 is inserted into the hole 3 and secured within it by pressing its flange portion 2a with a cover 13. The cover can be mounted in the male housing 4 by engaging its elastically deformable jaws 13a with fixed jaws 4a jutting from the male housing 4. The plug 2 may be secured in the housing 4 by screwing it thereinto or by forming a spring-biassed projection on one and forming a recess in the other. The end of the plug 2 is also made to be straight to be received in the straight portion of the hole 3. The straight portion 3A of the hole 3 has a slightly larger inner diameter than the outer diameter of the straight end of the plug 1 to allow self-alignment between the plugs.

The plug 1 is held in the female housing 8 so as to allow self-alignment as mentioned above. The female housing 8 is coupled to the male housing 4 with an elastic hook 9 on the former engaging under a projection 10 on the latter. The projection 10 has a tapered surface T and the elastic hook has a corresponding recess. To remove the female housing from the male housing, the upper end of the hook 9 is gripped to disengage its lower end from the projection 10.

Figure 6:
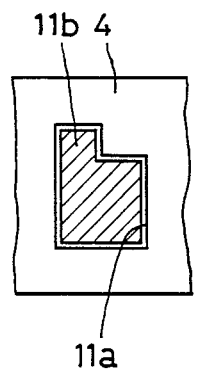
FIG. 6 is a sectional view taken along line X—X of FIG. 4.

The male and female housings are provided with means for ensuring that they are coupled in correct positions. Namely, the female housing is formed with a projection 11b of a generally L-shape as shown in FIG. 6 and the male housing 4 is formed with a recess 11a of the same shape to receive the projection 11b. This arrangement eliminates the possibility of two pairs of optical fibers being connected wrongly with each other.

The plug 1 in the female housing 8 is biassed by a spring 12 toward a flange 8a. A flange 1a on the plug 1 is adapted to abut the flange 8a. The spring 12 is supported between the cover 13 and the flange 1a on the plug 1.

The cover 13 for the female housing 8 is substantially the same as the cover for the male housing 4 with the elastically deformable jaws 13a engaging projections 8b on the female housing 8. However, the plug 1 is not rigidly but elastically held through the spring 12, unlike the plug 2 in the male housing 4. This and some clearance C between the flange 8a and the inner wall of the female housing 8 allow lateral displacement of the plugs 1, keeping parallel to each other.

Since there is some clearance between the plug 1 and the tapered portion 3b of the hole 3, the spring 12 urges the plug 1 to ensure that the ends of the optical fibers are butted against each other. Sometimes a coupling liquid is filled at the connection between the optical fibers.

Figure 7:
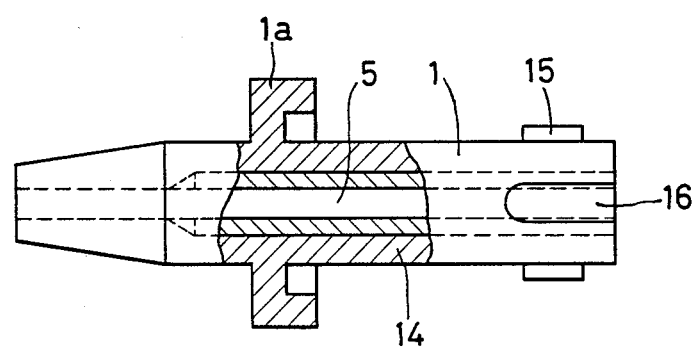
FIG. 7 is a view showing how an optical fiber is secured in the plug.
Figure 4:
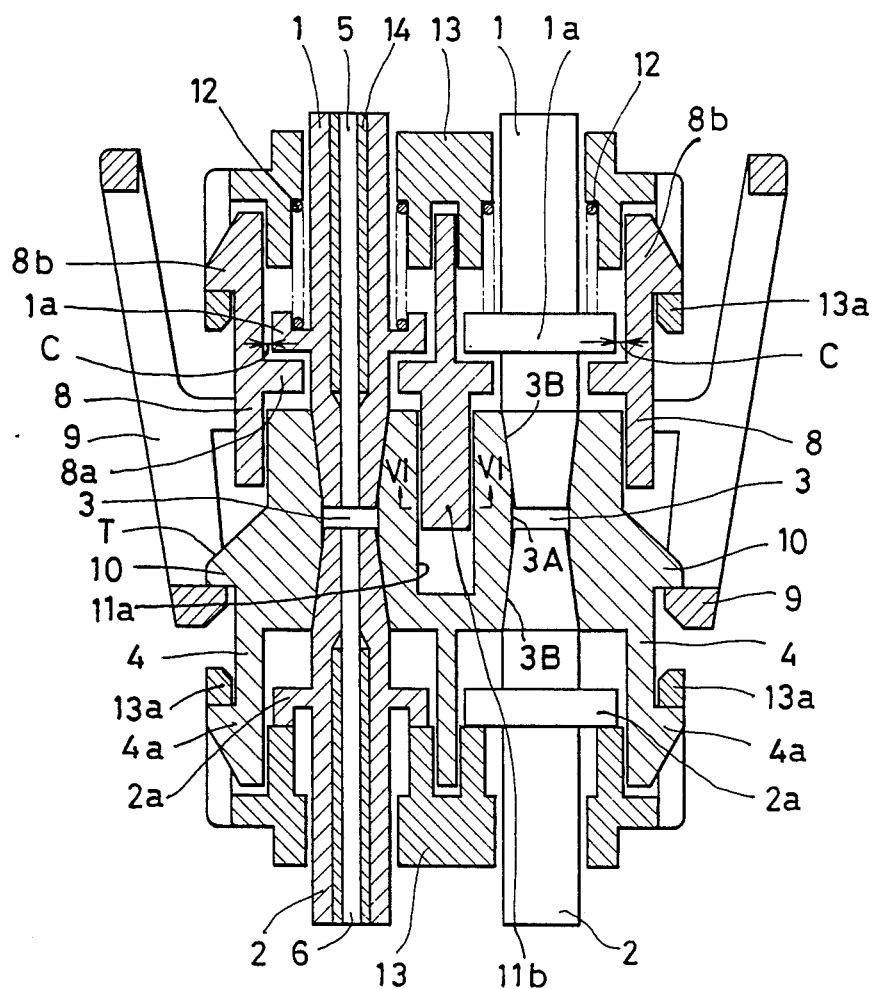
FIG. 4 is an enlarged longitudinal sectional view thereof.

As shown in FIG. 7, the optical fiber cables 5, 6 with their covering peeled off at the end are inserted in the plugs 1, 2 and are tightened with a metal ring 15. Each plug is formed with at least one axial slit 16 to aid in tightning with the metal ring. The optical fiber cables may be secured in the plugs with their covering not peeled off. In such a case, however, the accuracy of alignment depends on the accuracy of the covering. The covering may be peeled off with a stripping tool.

Figure 5:
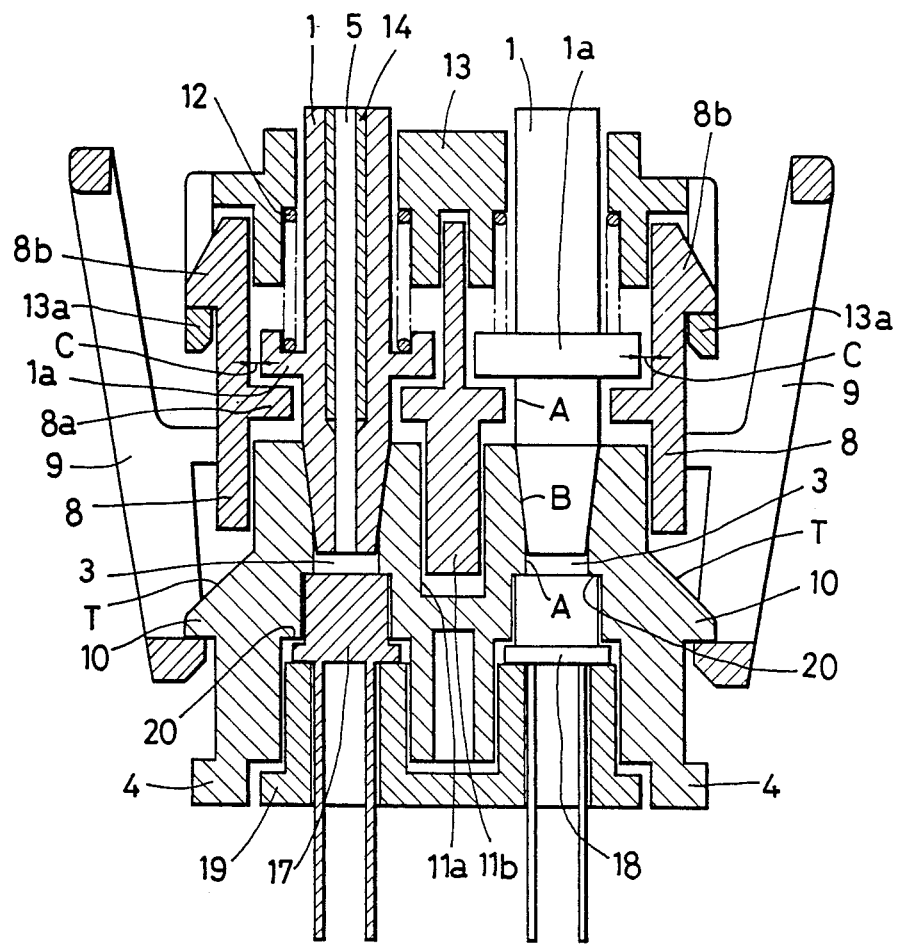
FIG. 5 is a view similar to FIG. 4 showing the second embodiment for connecting optical fibers with a light receiving element and a light emitting element.

FIG. 5 shows another embodiment which is intended for use for connection between optical fibers and light receiving elements or light emitting elements. It is substantially the same as the first embodiment in construction of its upper portion for the plug adapted for self-alignment. Like numerals are used to designate like elements. The light emitting element 17 and light receiving element 18 are pressed by a cover 19 into the holes 3 formed in the male housing 4. The holes 3 are formed with a shoulder 20 against which the ends of the light emitting element and the light receiving element abut.

What are claimed are:

1. A dual optical connector for connection between optical elements, comprising:

a first housing adapted to rigidly hold plugs each carrying an optical element, a second housing coupled to said first housing and adapted to elastically hold plugs each carrying an optical element, said first housing being formed with a pair of tapered alignment holes having alignment surfaces into which said plugs are inserted and aligned, said plugs held in said second housing having outwardly projecting tapered alignment surfaces adapted to engage said first housing alignment surfaces, said second housing having a forward wall formed with openings that freely pass said plug tapered alignment surfaces with said tapered alignment surfaces extending entirely forward of said wall openings, said plugs being supported by said second housing and being displaceable in a lateral direction relative to said openings and urged by springs into alignment holes.

2. A dual optical connector as set forth in claim 1 wherein the springs are resilient in the lateral direction for permitting the plugs held by the second housing to move in the lateral direction.

* * * * *